(12) United States Patent
Sayegh et al.

(10) Patent No.: US 9,862,330 B2
(45) Date of Patent: Jan. 9, 2018

(54) RACK FOR PICKUP TRUCKS AND TRAILERS

(71) Applicants: Jeffrey Dennis Sayegh, Big Bear City, CA (US); Michelle Marie Messang Sayegh, Big Bear City, CA (US)

(72) Inventors: Jeffrey Dennis Sayegh, Big Bear City, CA (US); Michelle Marie Messang Sayegh, Big Bear City, CA (US)

( * ) Notice: Subject to any disclaimer, the term of this patent is extended or adjusted under 35 U.S.C. 154(b) by 0 days.

(21) Appl. No.: 15/217,168

(22) Filed: Jul. 22, 2016

(65) Prior Publication Data

US 2017/0036615 A1    Feb. 9, 2017

Related U.S. Application Data

(60) Provisional application No. 62/200,254, filed on Aug. 3, 2015.

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC .... B60R 9/06; B60R 9/10; B60R 9/00; B60R 13/011; B60R 2013/016; B60P 3/40
USPC ................................................. 224/402–405
See application file for complete search history.

(56) References Cited

U.S. PATENT DOCUMENTS

| | | | |
|---|---|---|---|
| 611,709 A | 10/1898 | Sapp | |
| 4,717,055 A | 1/1988 | San Juan | |
| 5,232,237 A | 1/1993 | Patrick | |
| 5,265,897 A | 11/1993 | Stephens | |
| 5,417,629 A | 5/1995 | Phipps | |
| 5,875,947 A | 3/1999 | Noel et al. | |
| 6,036,069 A | 3/2000 | Sayegh | |
| 6,167,735 B1 | 1/2001 | Brown | |
| 6,425,501 B1 | 7/2002 | Keung et al. | |
| 6,494,351 B1 | 12/2002 | Dean | |
| 6,616,022 B1 * | 9/2003 | Naastad | B60R 9/06 224/519 |
| 6,758,380 B1 | 7/2004 | Kolda | |
| 6,851,590 B2 | 2/2005 | Dean | |
| 6,938,782 B2 | 9/2005 | Dean et al. | |
| 7,118,016 B1 * | 10/2006 | Kolda | B60R 9/06 224/281 |
| D561,680 S | 2/2008 | Foley et al. | |
| D562,218 S | 2/2008 | Foley et al. | |
| 7,798,752 B2 | 9/2010 | Harrison | |
| 7,841,638 B2 * | 11/2010 | Smith | B62D 33/0273 296/26.11 |

(Continued)

FOREIGN PATENT DOCUMENTS

FR    2 332155    6/1977

*Primary Examiner* — Corey Skurdal
(74) *Attorney, Agent, or Firm* — Joseph E. Mueth

(57) ABSTRACT

A three-dimensional rack useful in a pick-up truck or trailer having a bed with raised vertical side walls and a hinged rear tailgate. The rack has a first crossbar the ends of which are pivotally received at the opposed inside walls of the truck or trailer bed, a pair of matched spaced apart arms affixed to the first crossbar and a second crossbar affixed to said pair of arms, the arms being shaped so that the crossbars are horizontally and vertically displaced from each other while being parallel to each other.

8 Claims, 17 Drawing Sheets

(56) References Cited

U.S. PATENT DOCUMENTS

| | | | |
|---|---|---|---|
| D653,193 S | 1/2012 | Chisholm | |
| 8,191,952 B2* | 6/2012 | Mokhtari | B60P 3/42 |
| | | | 224/405 |
| 2003/0129038 A1* | 7/2003 | Addy | B60P 3/40 |
| | | | 410/97 |
| 2007/0246496 A1* | 10/2007 | Reeves | B60P 3/077 |
| | | | 224/403 |
| 2012/0118928 A1* | 5/2012 | Laws | B60R 9/10 |
| | | | 224/403 |
| 2013/0277404 A1* | 10/2013 | Heininger | B60R 9/10 |
| | | | 224/405 |
| 2013/0306694 A1* | 11/2013 | Langseder | B60R 5/041 |
| | | | 224/403 |
| 2015/0232041 A1* | 8/2015 | Wolfe | B60R 9/10 |
| | | | 224/403 |
| 2015/0329059 A1* | 11/2015 | Jobe | B60R 9/06 |
| | | | 224/403 |

\* cited by examiner

RACK FOR PICKUP TRUCKS AND TRAILERS

This patent application claims the benefit is a division of provisional patent application Ser. No. 62/200,254 filed Aug. 3, 2015, the disclosures of which are incorporated herein by reference.

FIELD OF INVENTION

This invention relates to a rack for carrying items in a pickup truck or trailer.

BACKGROUND OF INVENTION

Various carrying devices are known for carrying bicycles and other loads in a secure manner on automobiles, trucks and trailers. Examples are found in Sapp, U.S. Pat. No. 611,709, San Juan, U.S. Pat. No. 4,717,055, Patrick, U.S. Pat. No. 5,232,237, Stephens, U.S. Pat. No. 5,265,897, Phipps, U.S. Pat. No. 5,417,619, Noel, et. al., U.S. Pat. No. 5,875,947, Sayegh, U.S. Pat. No. 6,036,069, Brown, U.S. Pat. No. 6,167,735, Keung, et. al., U.S. Pat. No. 6,425,501, Dean, U.S. Pat. No. 6,494,351, and Kolda, U.S. Pat. No. 6,758,380, Dean, U.S. Pat. No. 6,851,590, Dean, et. al., U.S. Pat. No. 6,938,782, Foley, et. al., U.S. Design Pat. No. D561,680, Foley, et. al., U.S. Design Pat. No. D562,218 S, Chisholm, U.S. Design Pat. No. D653,193 S and Busset FR Pat. No. 2,332,155. The present invention provides a novel and improved rack system for pick-up trucks and trailers having a rear tailgate.

SUMMARY OF THE INVENTION

Briefly, the present invention comprises a three dimensional rack for a truck bed or trailer comprising a first generally horizontal crossbar pivotally carried by the opposed inside walls of a truck or trailer bed, a pair of matched spaced apart arms affixed to said first crossbar, and a second crossbar affixed to said pair of arms, said pair of arms each being shaped so that said crossbars are horizontally and vertically displaced from each other while being parallel to each other.

Further, the invention comprises a truck bed or trailer with horizontally disposed inside side walls and a tailgate having a three dimensional rack comprising a first generally horizontal crossbar pivotally carried by said opposed inside walls of said truck or trailer bed, a pair of matched spaced apart arms affixed to said first crossbar, and a second crossbar affixed to said pair of arms, said pair of arms each being shaped so that said crossbars are horizontally and vertically displaced from each other while being parallel to each other, said second crossbar being carried by said pair of arms rearwardly of the position of the tailgate when said tailgate is in its raised position.

THE DRAWINGS

DESCRIPTION OF THE PREFERRED EMBODIMENTS

Turning to the drawings in further detail:

The rack 10 comprises a first horizontal crossbar 12, a matched pair of spaced apart arms 14 and a second crossbar 16.

Figure 1:
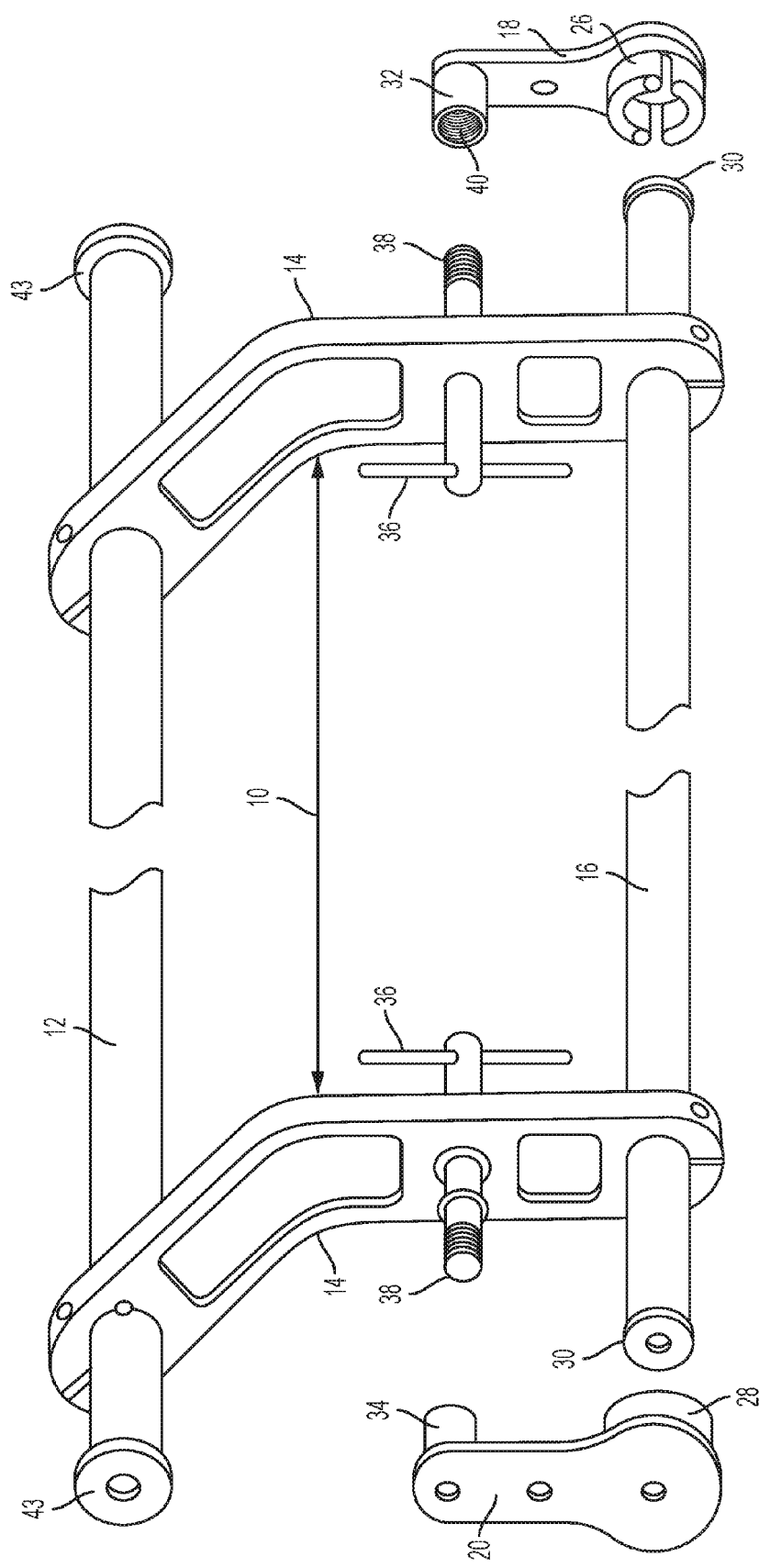
FIG. 1 is a perspective view of the rack of this invention also showing the mounting brackets.
Figure 2:
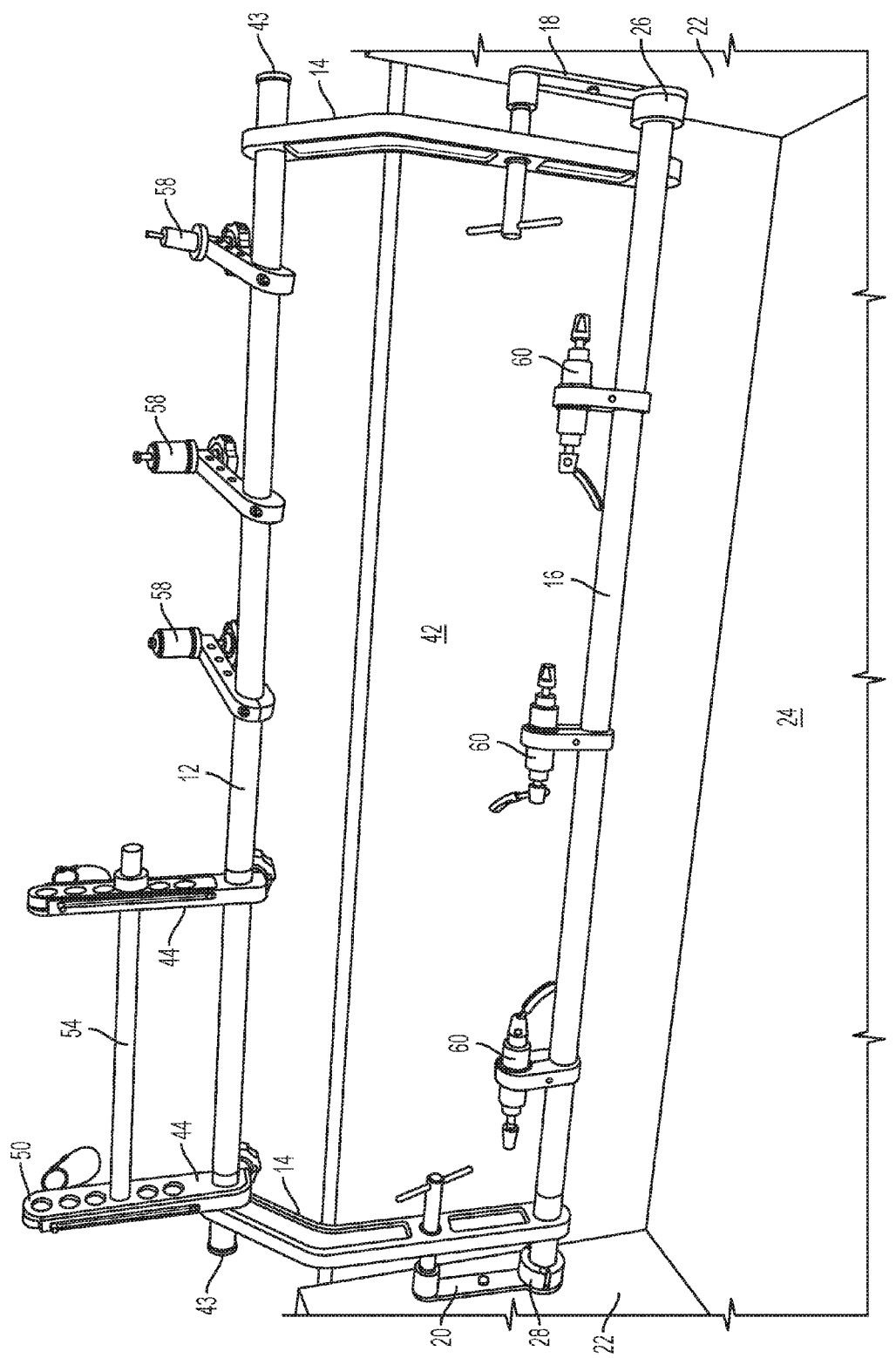
FIG. 2 is still another perspective view taken from inside the truck bed and looking towards the tailgate, showing various mounting devices.
Figure 3:
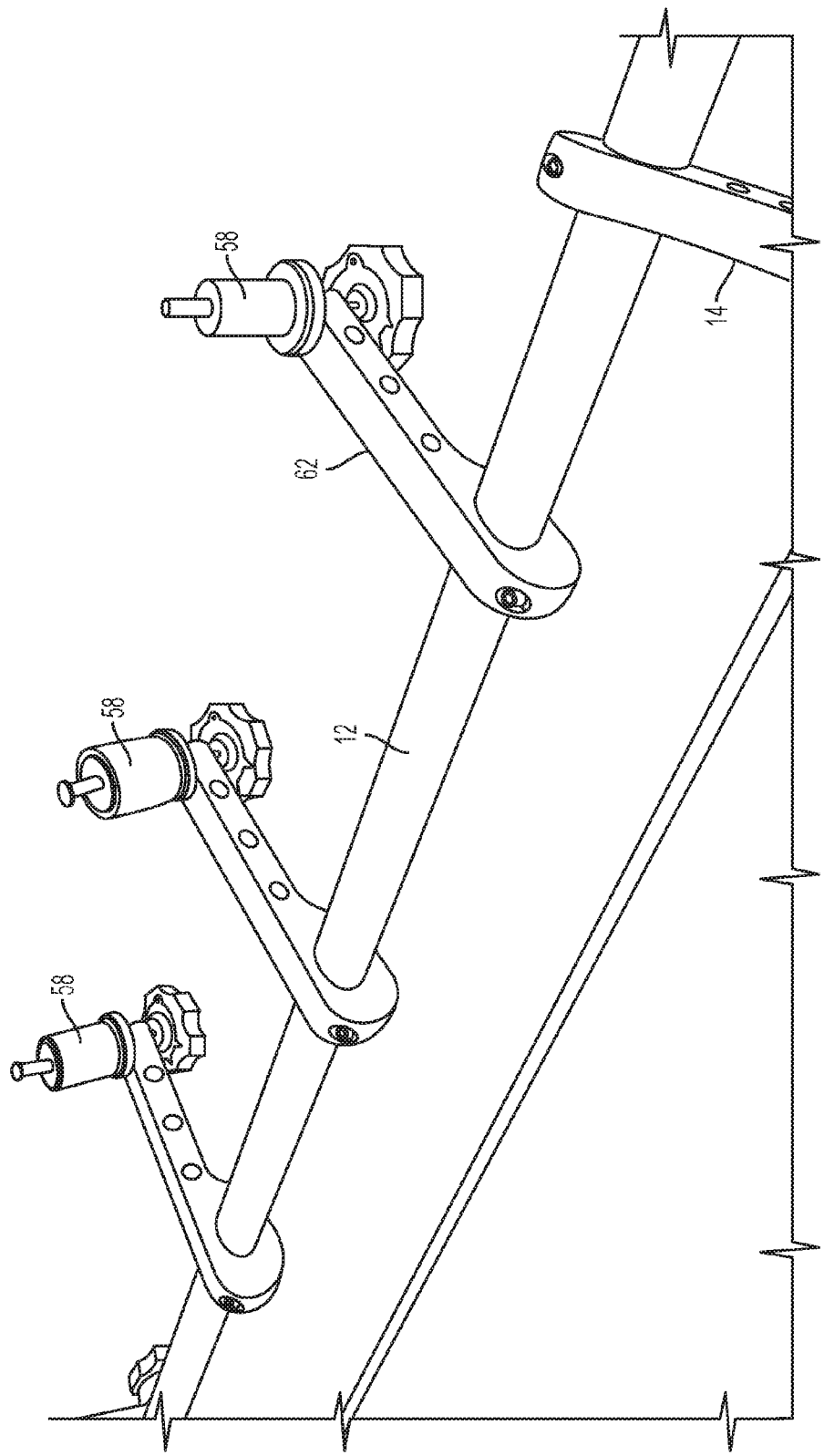
FIG. 3 is an enlarged perspective view showing the mounting devices at the upper right in FIG. 2.
Figure 4:
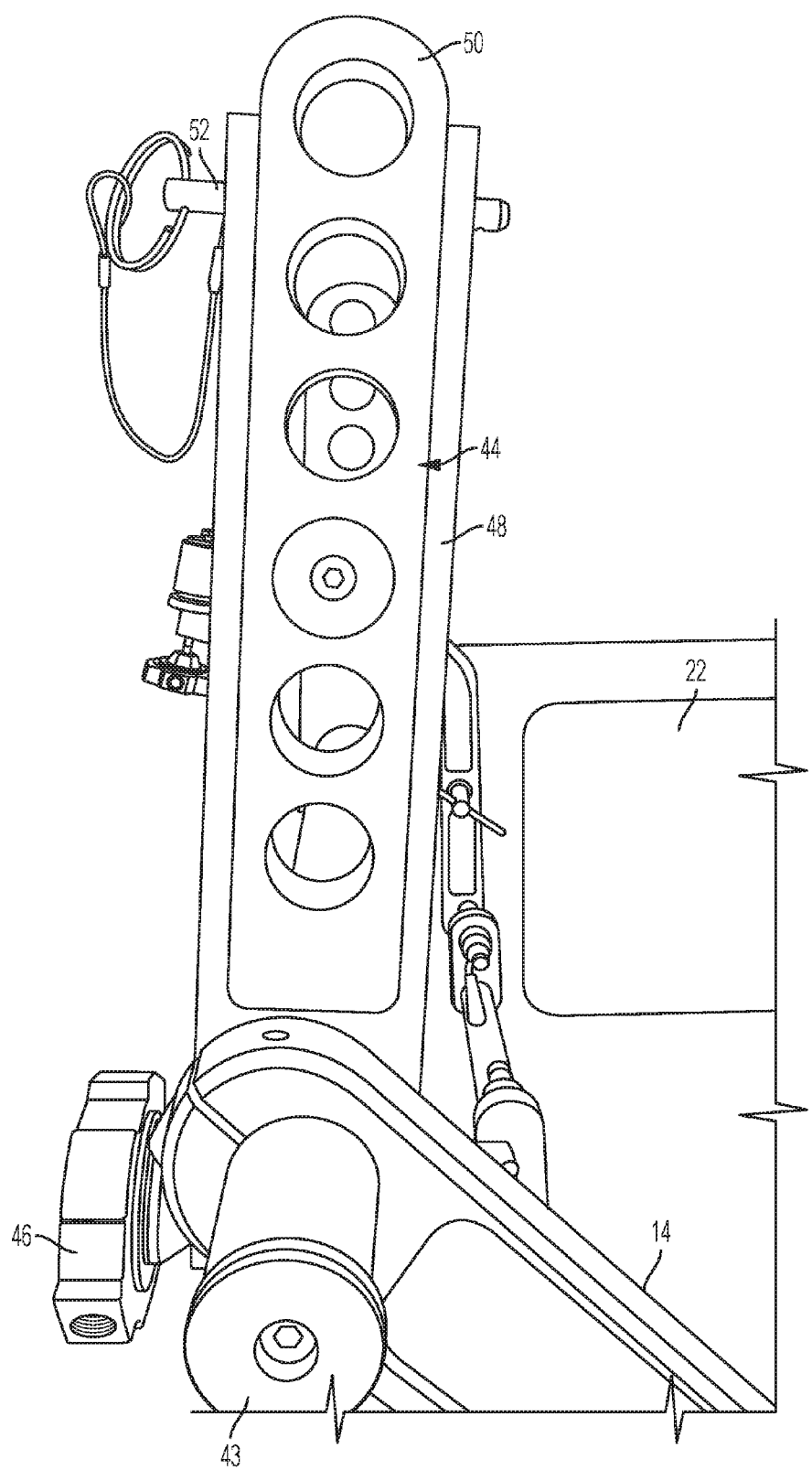
FIG. 4 is a partial perspective view showing a preferred embodiment of the rack installed in a truck bed. The rack has added adjustable vertical mounts.
Figure 5:
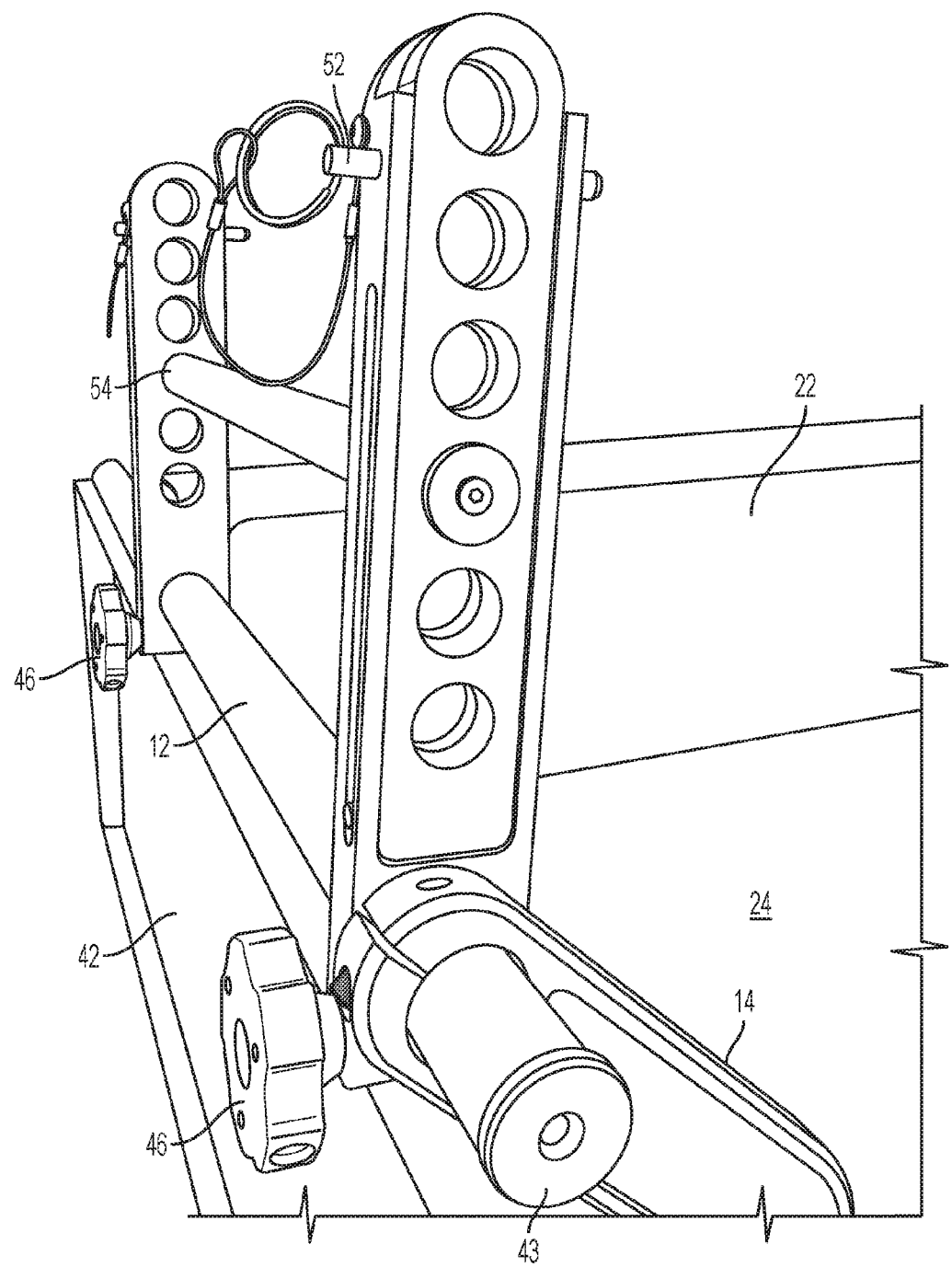
FIG. 5 is another perspective view of the rack of FIG. 4.

The matched pair of arms 14 as shown in the embodiment of FIGS. 1 and 2 are each angled at an oblique angle with the crossbars 12 and 16 together with the arms 14 forming a rigid unitary three dimensional configuration.

This unitary rack is carried by brackets 18 and 20 which are affixed by bolts or screws to the inside side walls 22 of a pickup truck or trailer bed 24 of common design.

The brackets 18 and 20 carry sockets 26 and 28. Crossbar 16 extends beyond arms 14 and has affixed end caps 30 which are received in sockets 26 and 28. Socket 28 has a circular opening in which cap 30 is snugly received. Socket 26 has a hinged opening which operates like a clam shell so that cap 30 can be laterally slipped into socket 26 and then closed to lock. The crossbar 16 with end caps is pivotally received in the sockets 26 and 28.

The brackets 18 and 20 each have an open threaded projection 32 and 34. The arms 14 each have a T handle 36 which can be slidably advanced in a hole in the arm so that threads 38 can be made up with threads 40. When these threads are made up, the rack cannot pivotally rotate about the sockets 26 and 28. When it is desired, for example, to stow the rack on the bed 24 of the pick up truck or trailer, the threads are undone by rotating the T handle 34 withdrawing the threads 38 so that they clear threaded projections 32 and 34 and rotating the rack forward.

Alternatively, the rack may be rotated rearwardly to be flat.

The rack 10 can be easily removed by undoing the threads by rotation of T-handle 36, unhinging socket 26, and laterally pulling the rack out while pulling the crossbar 16 free of socket 28.

When the rack is in the raised position, that is, with the threads 38 made up with threads 40, the first or upper crossbar 12 extends rearwardly of the rear of the pick up truck or trailer. Usually a pick up truck and many trailers have transverse tailgates 42. The rack when in the raised position as shown in FIG. 2 does not obstruct the operation of the tailgate which is hinged in the conventional way along its bottom edge at the bed. This is a significant advantage of this invention.

The end projections 43 of crossbar 12 are sufficiently shorter in length so as to clear the inside walls of the pick up truck or trailer bed when the rack is rotated forwardly onto the bed to stow.

As shown in FIG. 2, the crossbar 12 optionally may carry a pair (or more such as three or four) of vertical mounts 44 which are affixed to the crossbar by knobs 46.

Figure 6:
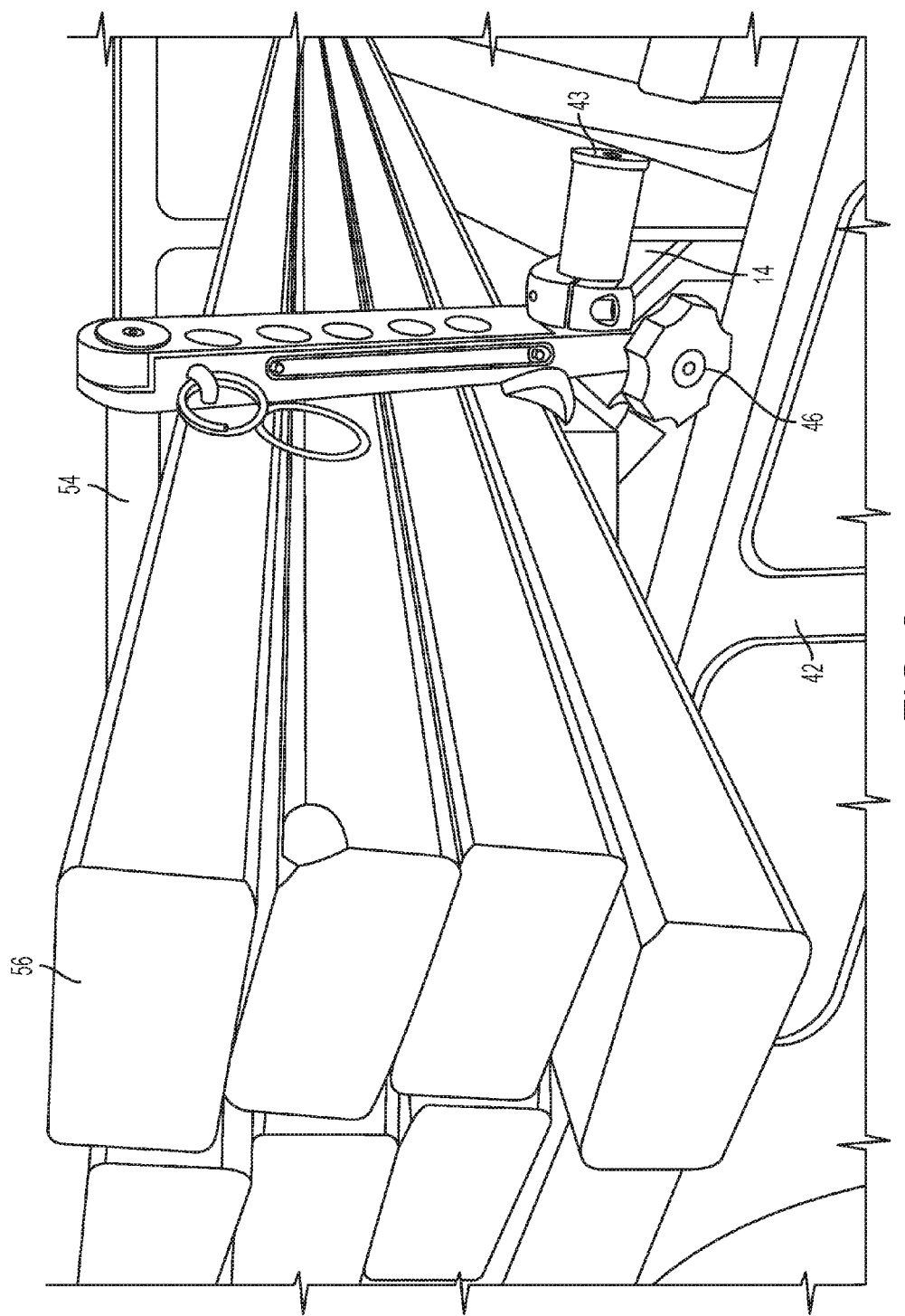
FIG. 6 is an enlarged perspective view from the rear of the truck bed of the vertical mounts of the rack showing the boards.
Figure 7:
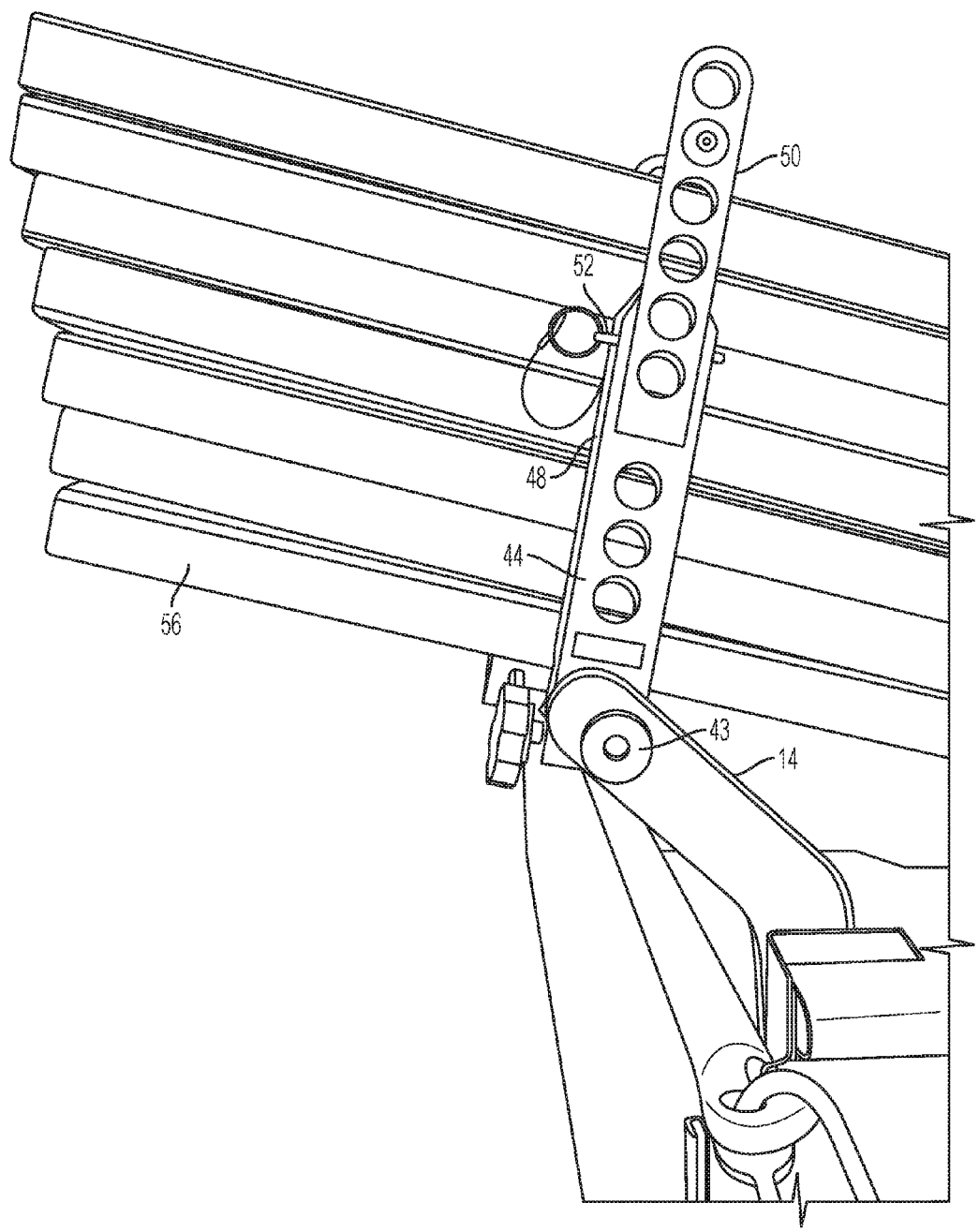
FIG. 7 is an enlarged side view of the embodiment of FIG. 6.
Figure 8:
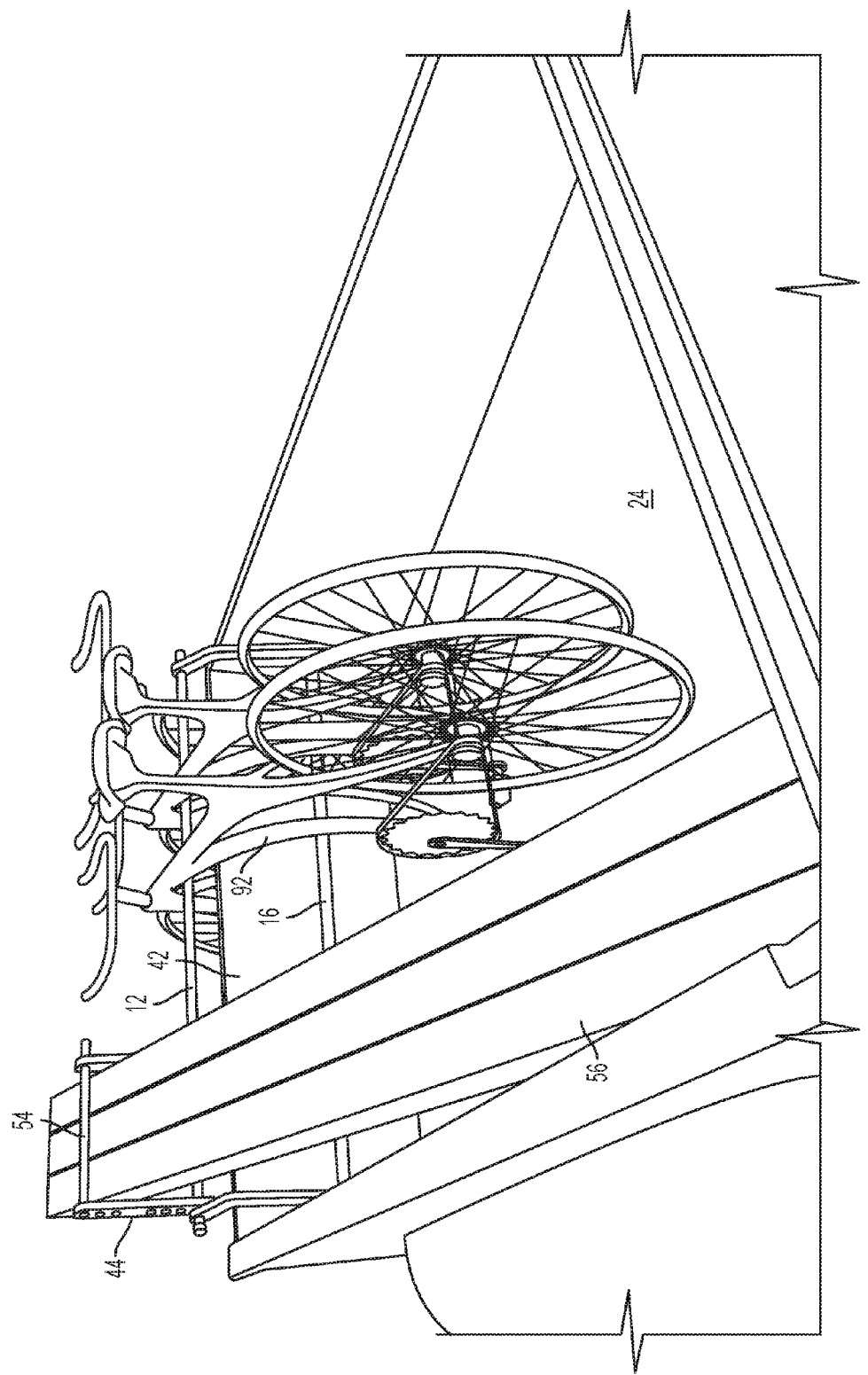
FIG. 8 shows the rack of FIGS. 6 and 7 carrying boards and bicycles looking towards the inside rear of the truck bed.
Figure 9:
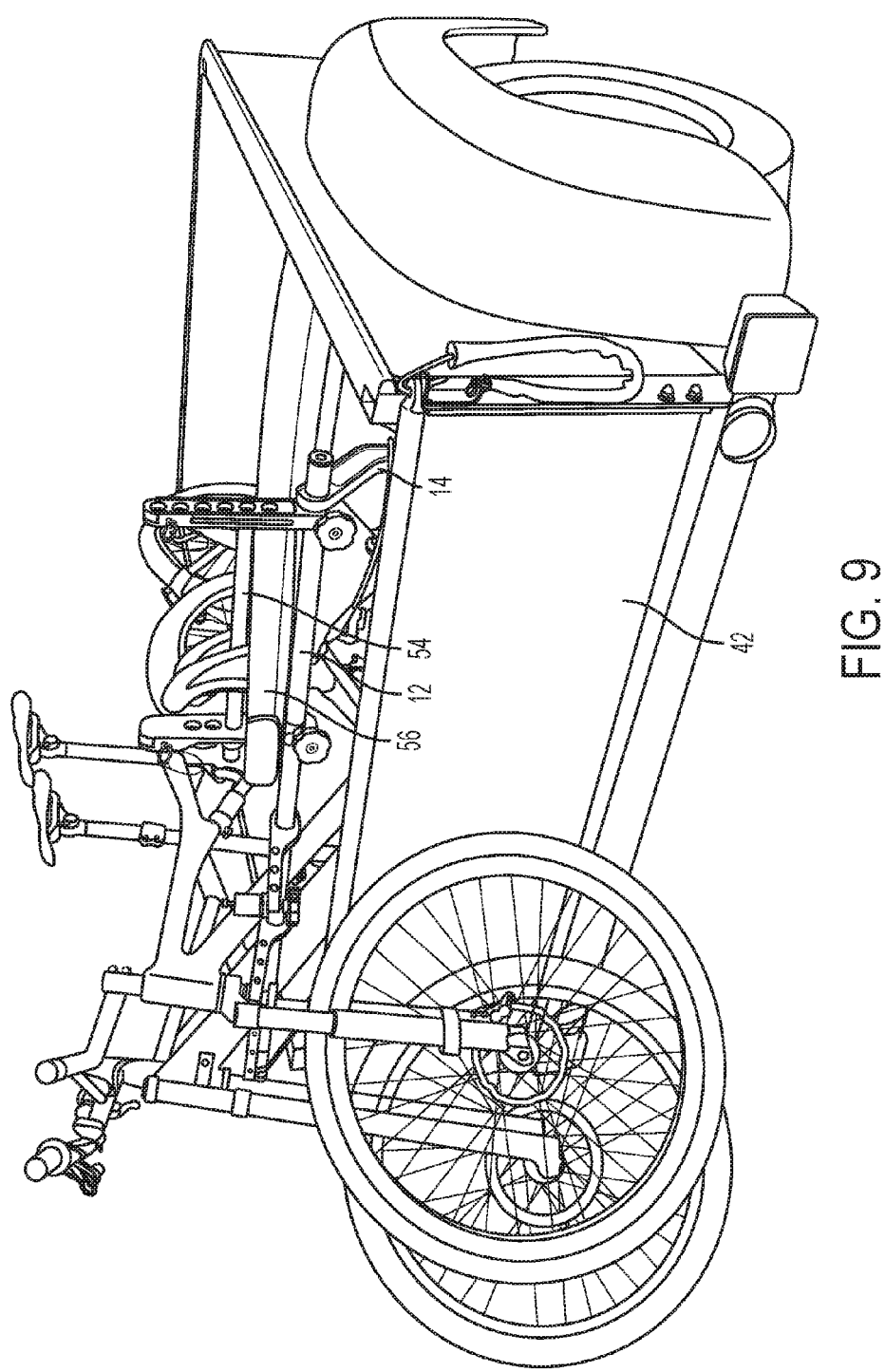
FIG. 9 is a rear perspective view of a trailer with tailgate and equipped with the rack of this invention carrying a bicycle.
Figure 10:
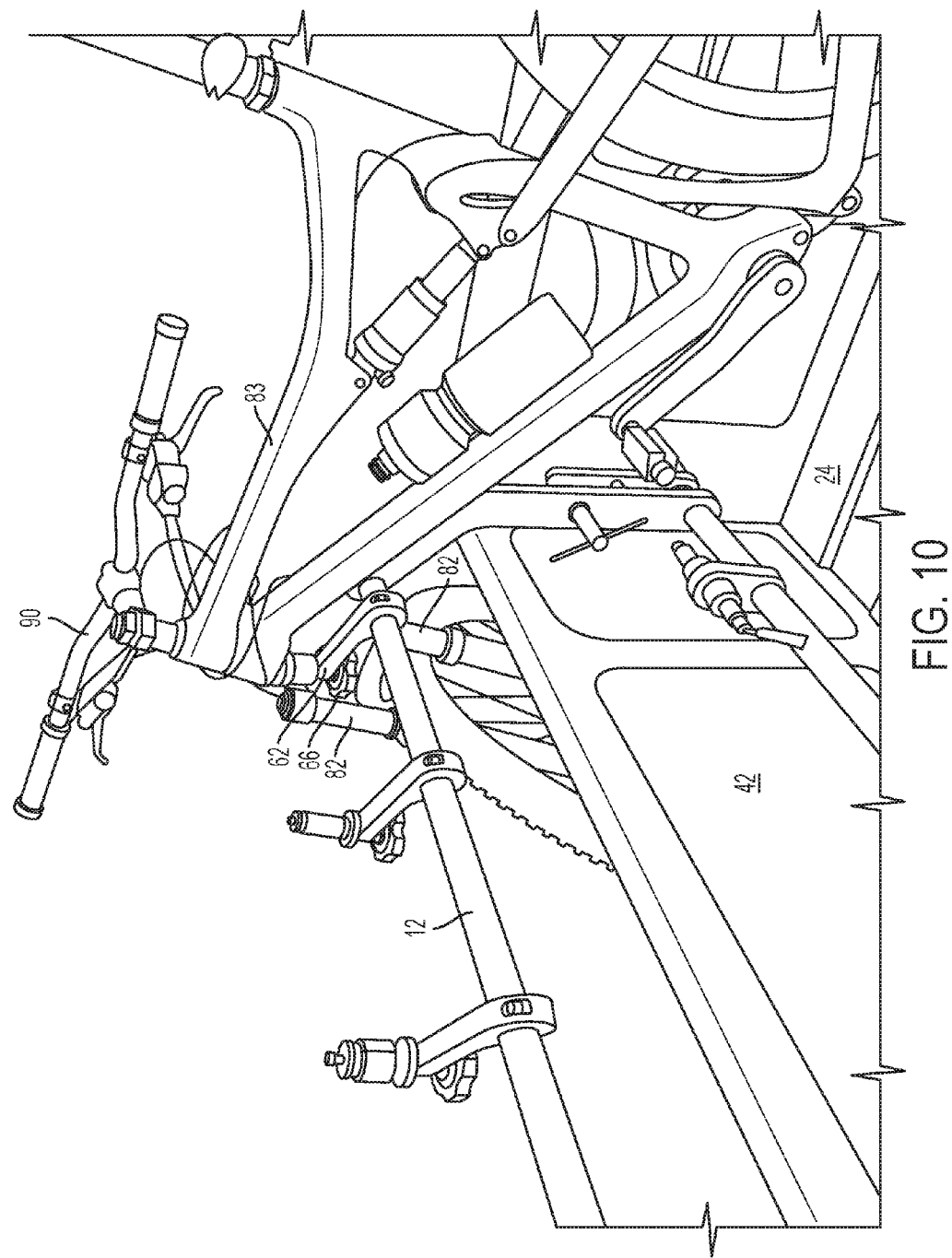
FIG. 10 is a perspective view at the rear left side of the truck bed showing the second crossbar carrying a bicycle.
Figure 11:
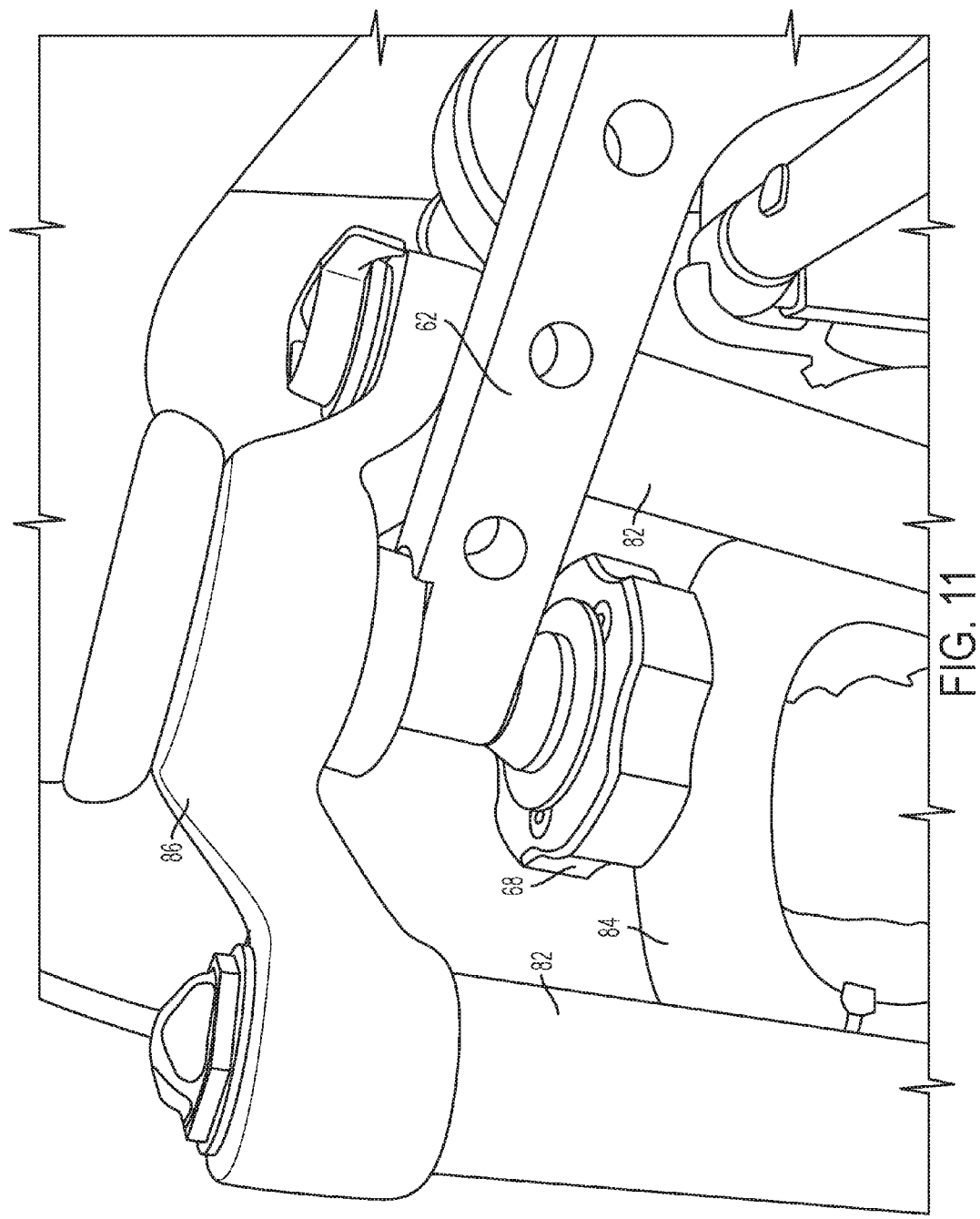
FIG. 11 is an enlarged perspective view showing the lateral extension from the second crossbar and its attachment to the fork crown of a bicycle.
Figure 12:
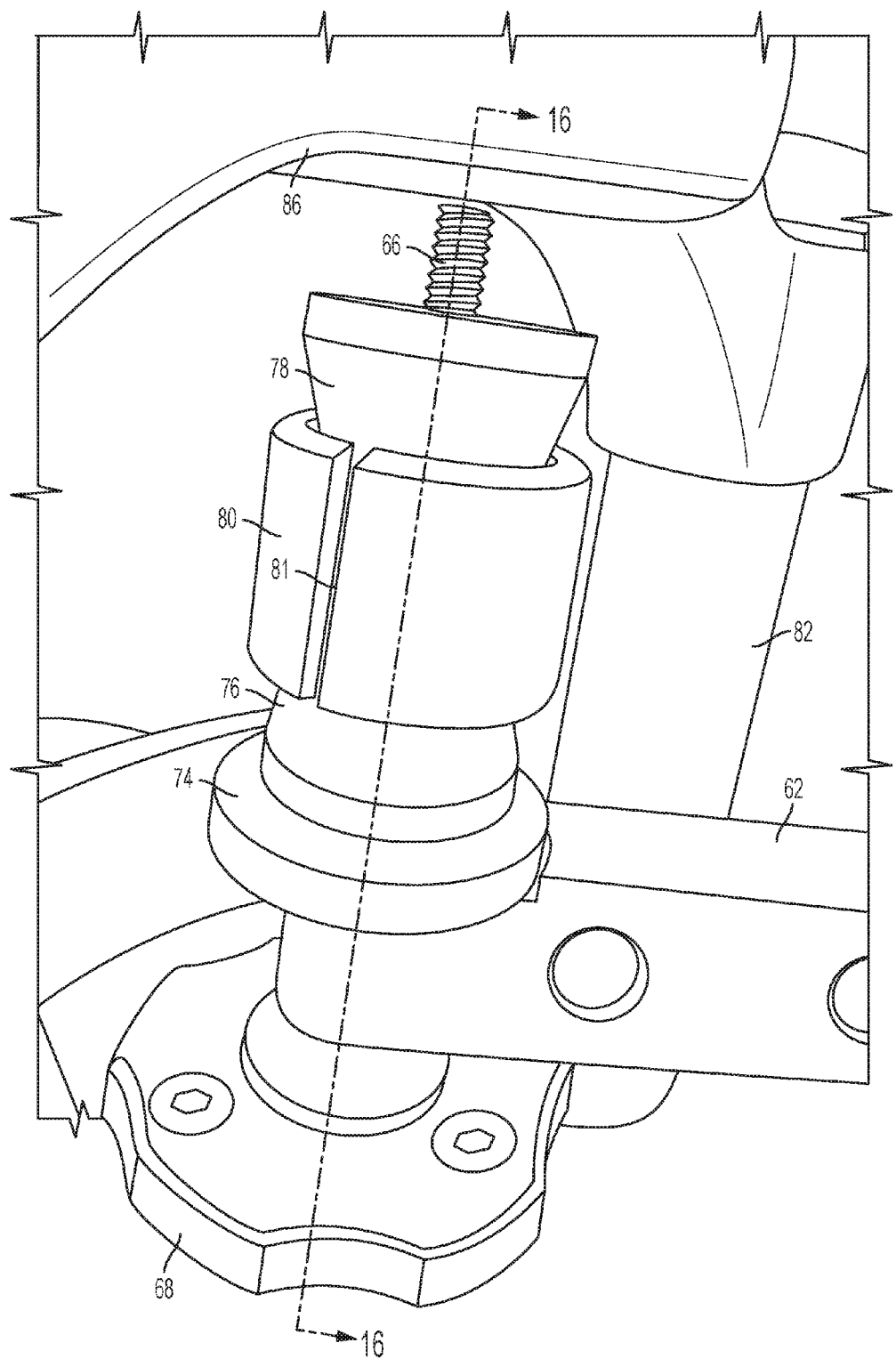
FIG. 12 shows the attachment shown in FIG. 11 completely detached.
Figure 13:
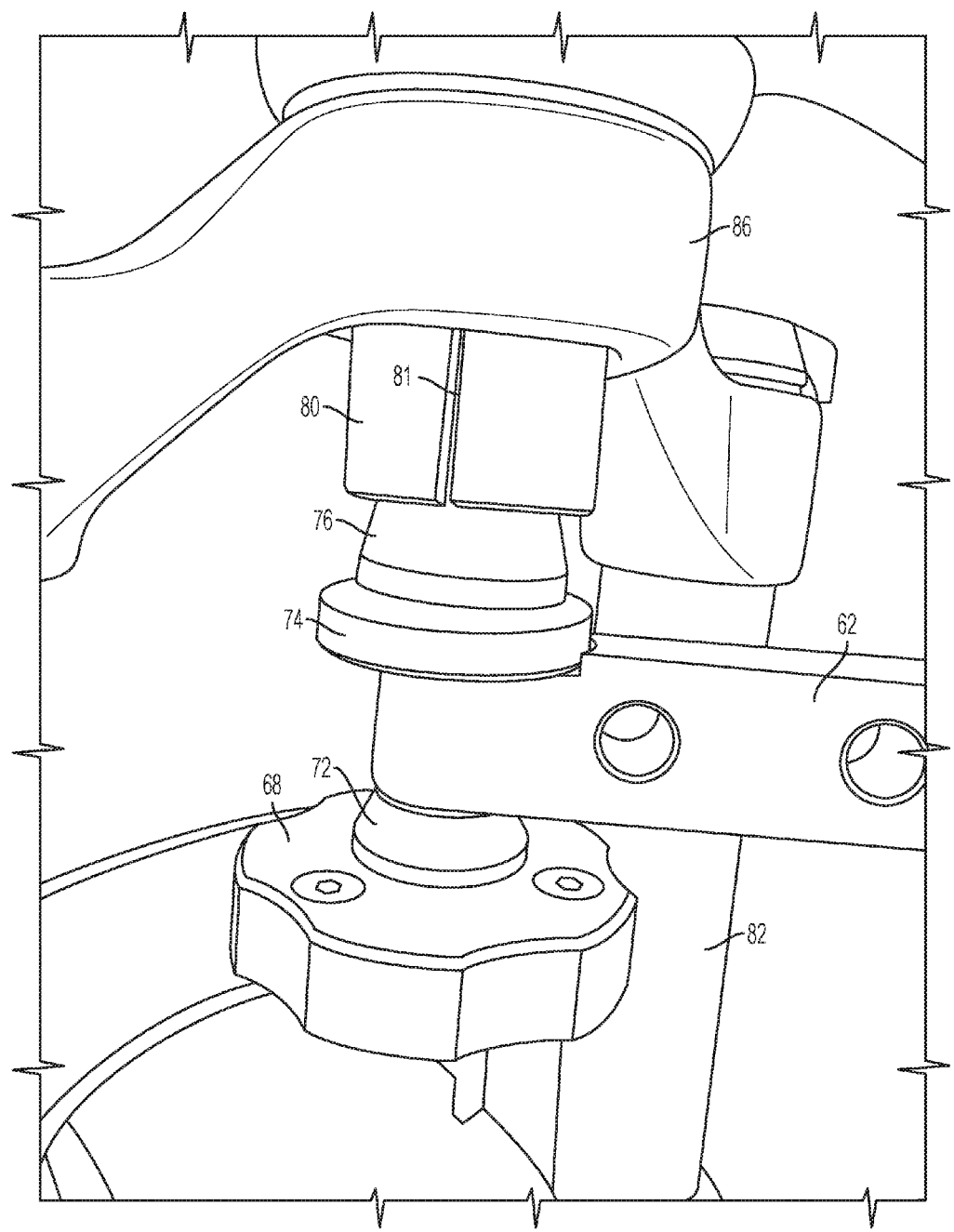
FIG. 13 shows the parts of FIG. 12, partially assembled.
Figure 14:
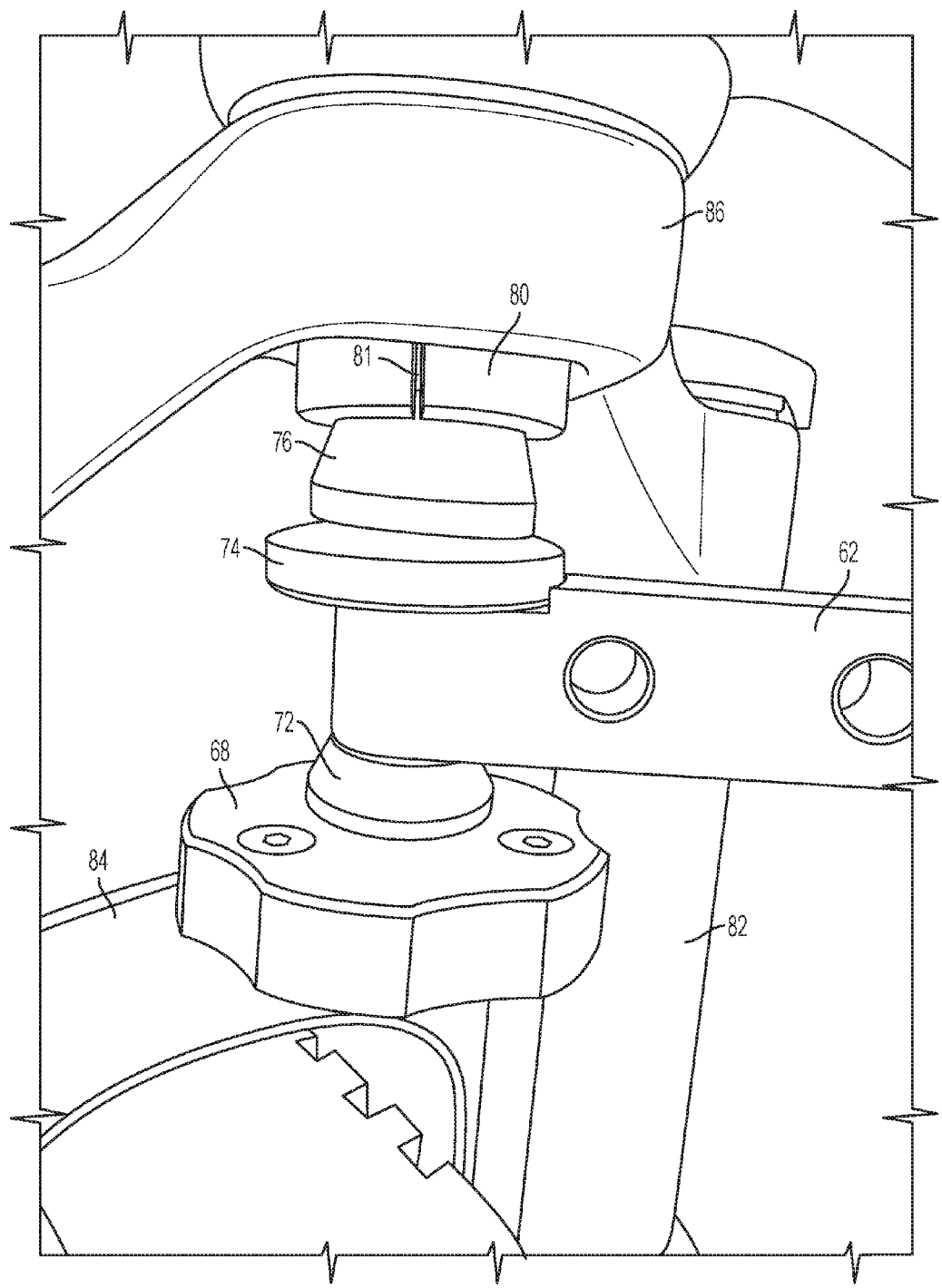
FIG. 14 shows the parts of FIGS. 12 and 13 more fully assembled.
Figure 15:
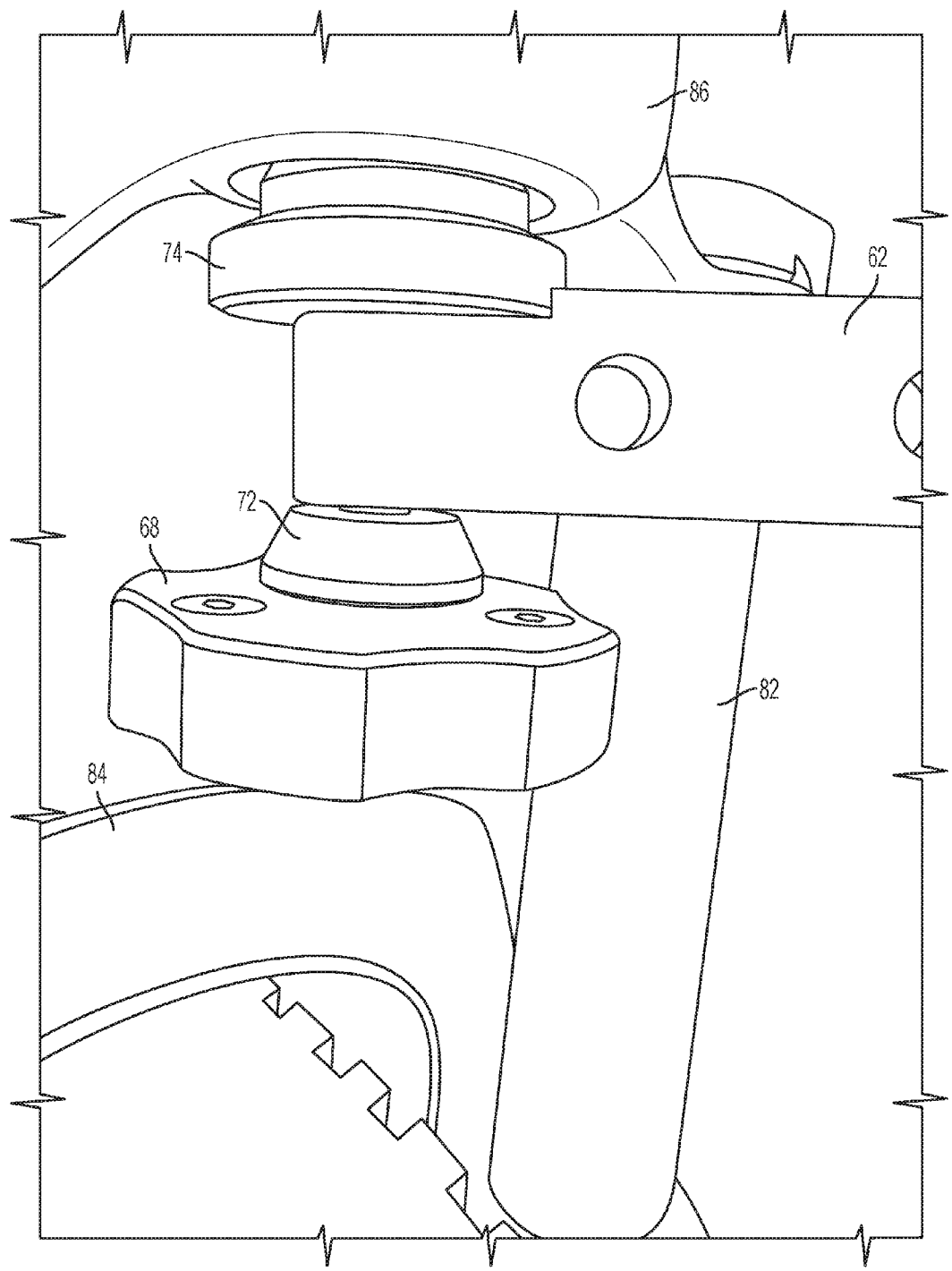
FIG. 15 shows the parts of FIGS. 12 through 14 fully assembled.

The vertical mounts comprise a track portion 48 and a slide member 50 received in the track portion 48. The track portion and the slide member have a series of spaced apart holes along their vertical dimension which are adapted to receive pin 52. The slide portion 50 can carry a crossbar 54. By removing pin 52, the slide portion 50 carrying crossbar 54 can be raised or lowered in track portion 48 to change the spacing between crossbar 12 and crossbar 54 to suit the intended purpose such as to clamp therebetween a load of lumber 56 as exemplified by FIGS. 6 and 7. This clamping arrangement is applicable to a wide variety of elongated loads, including surfboards, standup paddle boards, kayaks, pipes, tree trunks and the like. Such loads may or may not extend the full length of the bed.

Attachment devices 58 and 60 provide connections of the rack to other loads such as bicycles.

Figure 16:
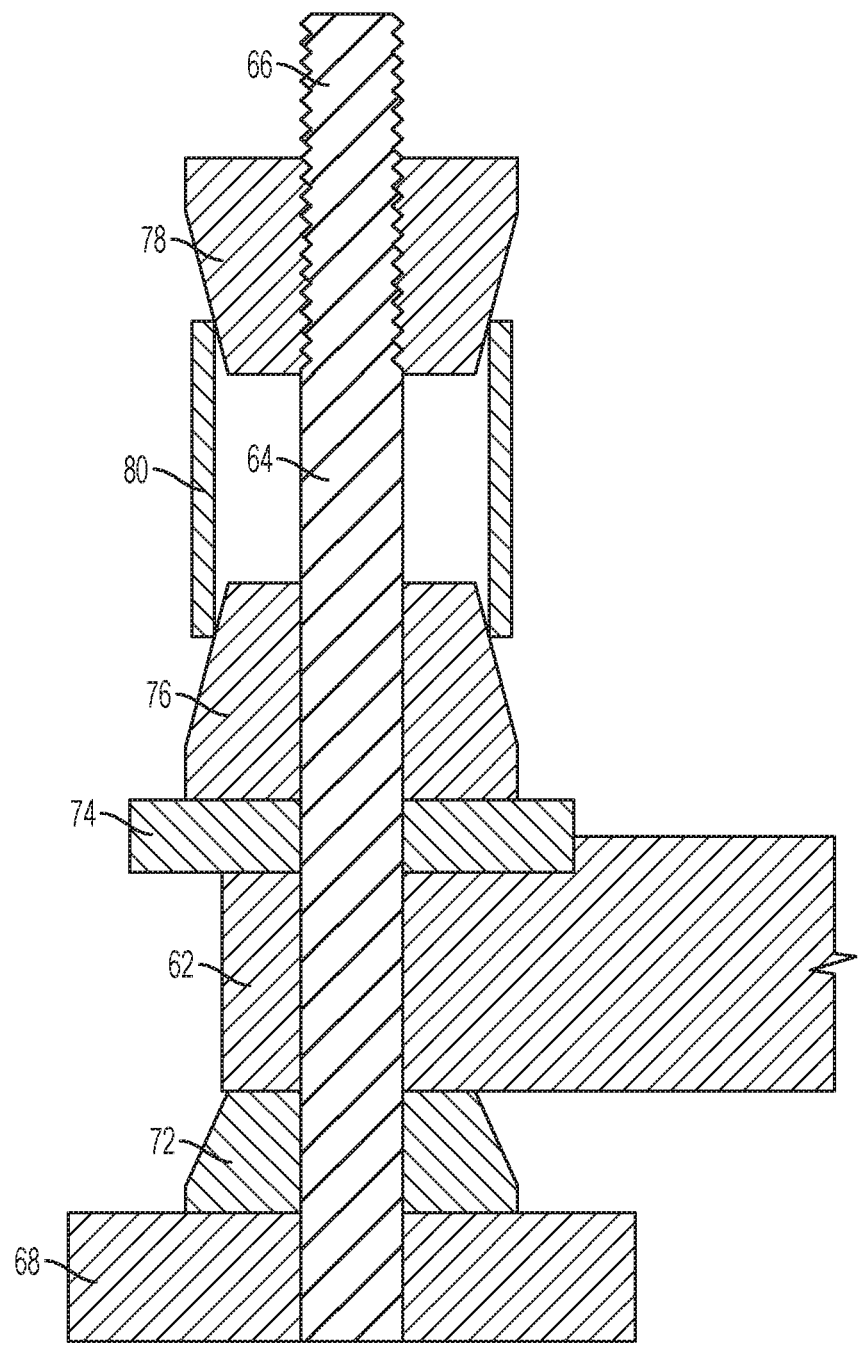
FIG. 16 is a longitudinal sectional view taken along the line 16-16 in FIG. 12 of the attachment used to attach the fork crown of a bicycle to the lateral extension.
Figure 17:
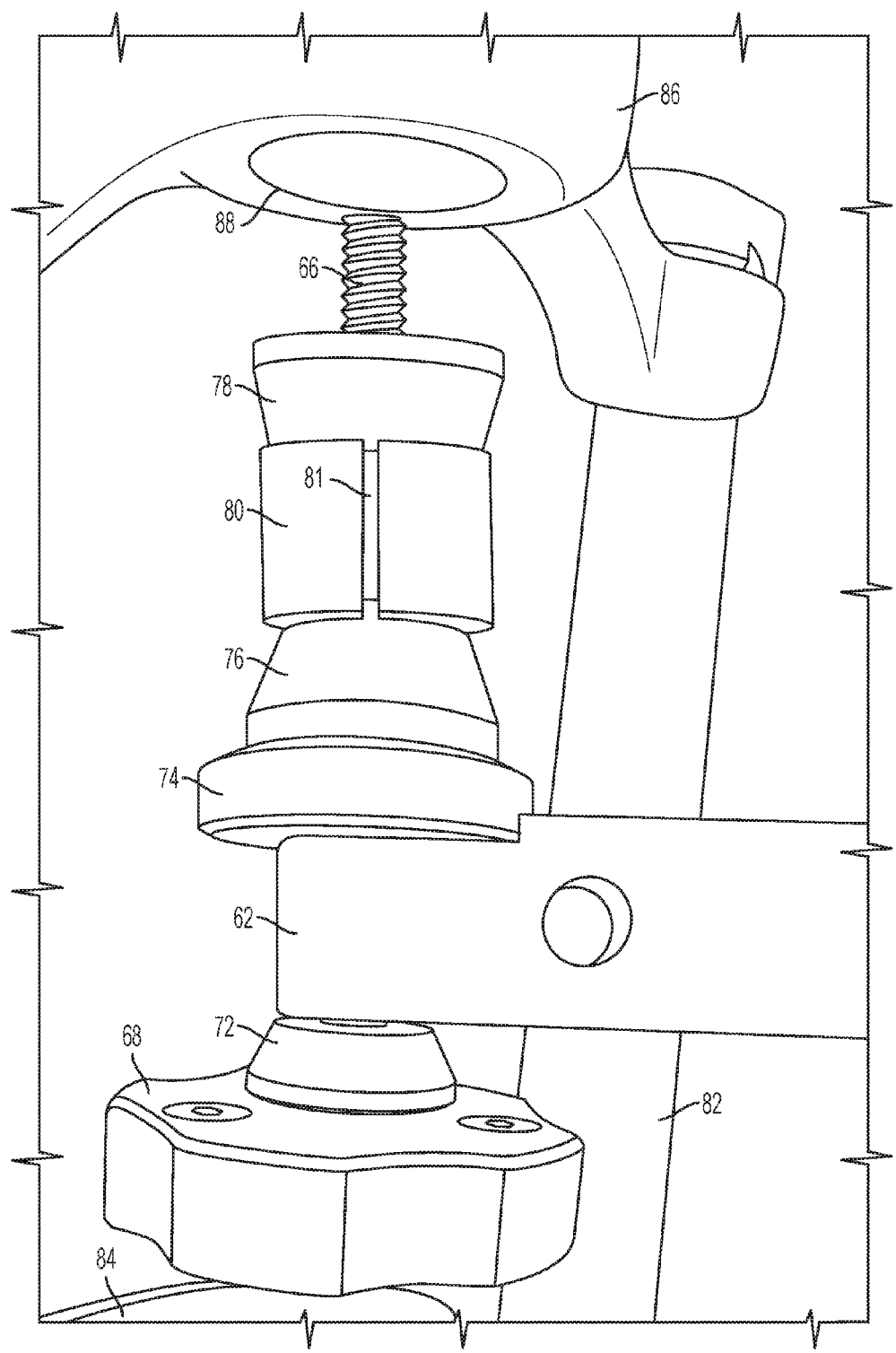
FIG. 17 is a perspective view showing the underside of the fork crown with the attachment prior to the beginning of attachment.

The attachment 58 depends from arm 62 which is secured to crossbar 12 by a set screw. The attachment 58 is carried at the free end of arm 62 and comprises shaft 64 which has threaded end portion 66. Shaft 64 is affixed to knob 68. The shaft 64 is slidably received in a through hole in arm 62. As shown in FIG. 16, spacers 72 and 74 are slidably received on shaft 64, spacer 72 between arm 62 and knob 68, and spacer 74 between arm 62 and conical element 76, conical element 76 being slidably received on shaft 64. Shaft 64 has another conical element 78 which is threadably received on threaded end portion 66 of shaft 64. There is an expandable sleeve 80 which is carried around conical portions 76 and 78. Sleeve 80 has a lengthwise slit or opening 81 which can expand when knob 68 is rotated as is explained below. This rotation advances conical element 76 into sleeve 80. Since conical element 78 is prevented from movement by threaded end portion 66, the result is that as conical element 76 is advanced, conical elements 76 and 78 move closer together and their converging conical surface causes the sleeve 80 to diametrically expand.

When the knob 68 is turned so that the conical element is more separated, the sleeve 80 is not expanded.

Turning to the use of attachment 58 for carrying a mountain or suspension bike 83, these bikes typically have two fork legs 82, a lower fork frame 84, a fork crown 86 having a hollow steer tube 88 fixedly projecting upwardly from the center of fork crown 86 and passing therethrough. As those skilled in the art will understand, the front wheel of the bike is held in place between fork legs 82 by an axle or similar means. The free upper open end of the steer tube 88 carries the bike handlebars 90. The bike has the typical frame members 92.

In attaching a bike to attachment 58, the shaft 64 carrying conical elements 76 and 78 and sleeve 80 along with the spacers is inserted into the hollow steer tube 88 located at the center of fork crown 86. By then turning knob 68, conical element 76 is advanced within sleeve 80 and sleeve 80 slides on conical element 78, resulting in its diametrical expansion of sleeve 80 at slit 81 to engage the smooth inside surface of steer tube 88, and thereby securely holding the bike to attachment point 58. When it is desired to remove the bike, the knob 68 is counter-rotated, withdrawing conical element 76 and allowing the sleeve to assume its unstressed smaller diameter, freeing fork crown 86.

The invention claimed is:

1. A three dimensional rack for a truck bed or trailer having horizontally opposed inside walls comprising:
    a first generally horizontal crossbar adapted to be pivotally carried by brackets affixed to said opposed inside walls of a truck or trailer bed;
    a pair of matched spaced apart arms affixed to said first crossbar; and
    a second crossbar affixed to said pair of arms, said pair of arms each having a bent portion between said crossbars so that said crossbars are horizontally and vertically displaced from each other while being parallel to each other, and wherein said first generally horizontal crossbar extends beyond said arms and terminates in ends adapted to be received in said brackets.

2. The three-dimensional rack of claim 1 wherein said second crossbar carries a pair of generally vertical length adjustable arms which carry a third crossbar extending laterally between them.

3. The three-dimensional rack of claim 1 wherein said second crossbar carries a pair of generally vertical length adjustable arms which carry a third crossbar vertically spaced from said second crossbar and extending laterally between them, whereby the vertical spacing between said second and third crossbars can be adjusted to clamp therebetween one or a plurality of elongated members, said third crossbar being shorter than said second crossbar.

4. The three-dimensional rack of claim 1 wherein said first generally horizontal crossbar extending beyond said arms and has affixed end caps.

5. The combination of a three dimensional rack and a pair of brackets affixed to horizontally opposed inside walls of a pick up truck or trailer bed, said rack comprising:
    a first generally horizontal crossbar adapted to be pivotally carried by said brackets;
    a pair of matched spaced apart arms affixed to said first crossbar; and
    a second crossbar affixed to said pair of arms, said pair of arms each having a bent portion between said crossbars so that said crossbars are horizontally and vertically displaced from each other while being parallel to each other, and wherein said first generally horizontal crossbar extends beyond said arms and terminates in ends received in said brackets.

6. A truck bed or trailer with horizontally opposed inside side walls and a tailgate which is adapted to be raised and lowered having a three dimensional rack comprising:
    a first generally horizontal crossbar pivotally carried by brackets affixed to said opposed inside walls of said truck or trailer bed;
    a pair of matched spaced apart arms affixed to said first crossbar; and a second crossbar affixed to said pair of arms, said pair of arms each being bent between said crossbars so that said crossbars are horizontally and vertically displaced from each other while being parallel to each other, said second crossbar being carried by said pair of arms rearwardly of the position of the tailgate when said tailgate is in its raised position, wherein said first generally horizontal crossbar extends beyond said arms and terminates in ends adapted to be received in brackets.

7. The combination of a bicycle and a rack, the rack being three dimensional and comprising:
a first generally horizontal crossbar adapted to be pivotally carried by brackets affixed to opposed inside walls of a truck or trailer bed;
a pair of matched spaced apart arms affixed to said first crossbar;
a second crossbar affixed to said pair of arms, said pair of arms each being bent between said crossbars so that said crossbars are horizontally and vertically displaced from each other while being parallel to each other; and
a lateral arm extending from said second crossbar and being adapted to attachably and detachably carry said bicycle, and wherein said first generally horizontal crossbar extends beyond said arms and terminates in ends adapted to be received in said brackets.

8. The combination of claim 7 wherein said lateral arm has a free end having a hole therein, a shaft extending therethrough and having a threaded end, said shaft carrying two opposed conical elements comprising an upper conical element and a lower conical element, the lower conical element being slidable in said shaft, the upper conical element being threadably received on said shaft, a sleeve received between said conical elements having a longitudinal slit therein whereby as said lower conical element is advanced on said shaft, the diameter of said sleeve is increased;
said bicycle having a hollow steer tube,
said shaft, conical elements and sleeve being received in said hollow steer tube of said bicycle, said bicycle being locked to said shaft as the lower conical element is advanced on said shaft.

* * * * *